United States Patent
Whiting et al.

(10) Patent No.: US 11,032,289 B2
(45) Date of Patent: Jun. 8, 2021

(54) CLONING MANAGEMENT SYSTEM FOR TOUCHLESS DEVICE LEVEL OR GROUP FLEET MANAGEMENT

(71) Applicant: Xerox Corporation, Norwalk, CT (US)

(72) Inventors: John F. Whiting, Webster, NY (US); Keith S. Watson, Spencerport, NY (US); Noah Ullmann, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 346 days.

(21) Appl. No.: 16/247,682

(22) Filed: Jan. 15, 2019

(65) Prior Publication Data
US 2020/0228537 A1 Jul. 16, 2020

(51) Int. Cl.
*H04L 29/06* (2006.01)
*H04L 29/08* (2006.01)
*G06F 16/901* (2019.01)

(52) U.S. Cl.
CPC .......... *H04L 63/104* (2013.01); *H04L 63/102* (2013.01); *H04L 67/04* (2013.01); *H04L 67/1095* (2013.01); *H04L 67/34* (2013.01); *G06F 16/9027* (2019.01)

(58) Field of Classification Search
CPC .................................................... H04L 63/104
USPC ............................................................. 726/5
See application file for complete search history.

(56) References Cited

U.S. PATENT DOCUMENTS

| | | | | |
|---|---|---|---|---|
| 5,970,496 | A  * | 10/1999 | Katzenberger | ...... G06F 16/9024 |
| 6,480,963 | B1 * | 11/2002 | Tachibana | ........... H04L 63/0227 |
| | | | | 713/166 |
| 7,917,947 | B2 * | 3/2011 | Yang | ....................... H04L 41/28 |
| | | | | 726/15 |
| 9,514,249 | B2 * | 12/2016 | Ge | ....................... G06F 16/9027 |
| 10,169,571 | B1 * | 1/2019 | Attfield | .................... G06F 21/50 |
| 10,509,701 | B2 * | 12/2019 | Tamura | ............... G06F 11/1451 |
| 2004/0201471 | A1 * | 10/2004 | Primm | ............. G08B 13/19671 |
| | | | | 340/506 |
| 2005/0071390 | A1 * | 3/2005 | Midgley | ............. G06F 11/1464 |

(Continued)

OTHER PUBLICATIONS

Chun et al., "CloneCloud: Boosting Mobile Device Applications Through Cloud Clone Execution", 2010 (Year: 2010).*

(Continued)

*Primary Examiner* — Ondrej C Vostal
(74) *Attorney, Agent, or Firm* — Fay Sharpe LLP (57) ABSTRACT

Described herein is a method of processing location and level changes for managed devices, which includes a child device sensing a move to a new location and level in a tree structure including levels having different permissions and policies, and the child device receiving permissions and policies for the new location and level via a master clone file. Also described is a method of updating policies in a device in a fleet of image forming devices that includes identifying a setting in the device that should not be updated automatically, setting a respective flag associated with the identified setting, thereby indicating that the setting is not to be updated automatically, receiving a file with updated policy values, and updating settings of the device according to the updated policy values except for the identified setting. Also described is a method for processing exemption requests in a fleet of image forming devices.

20 Claims, 6 Drawing Sheets

(56) References Cited

U.S. PATENT DOCUMENTS

| | | | | |
|---|---|---|---|---|
| 2006/0236381 | A1* | 10/2006 | Weeden | H04L 63/101 |
| | | | | 726/6 |
| 2012/0330904 | A1* | 12/2012 | Factor | G06F 16/1748 |
| | | | | 707/692 |
| 2015/0178253 | A1* | 6/2015 | Kim | G06F 40/106 |
| | | | | 715/234 |
| 2016/0070741 | A1* | 3/2016 | Lin | G06F 16/1774 |
| | | | | 707/624 |
| 2016/0337164 | A1* | 11/2016 | Klaedtke | H04L 47/2483 |
| 2017/0004203 | A1* | 1/2017 | Pandit | G06F 16/316 |
| 2017/0060898 | A1* | 3/2017 | Lu | G06F 16/2246 |
| 2017/0123931 | A1* | 5/2017 | Aizman | G06F 16/275 |
| 2017/0374079 | A1* | 12/2017 | Labunets | H04L 63/1408 |
| 2019/0095644 | A1* | 3/2019 | Park | G05B 15/02 |
| 2019/0340269 | A1* | 11/2019 | Biernat | G05B 19/41865 |

OTHER PUBLICATIONS

Rodeh et al., "BTRFS: the Linux B-Tree Filesystem", pp. 8-9, 2013 (Year: 2013).*

* cited by examiner

CLONING MANAGEMENT SYSTEM FOR TOUCHLESS DEVICE LEVEL OR GROUP FLEET MANAGEMENT

BACKGROUND

Today, information technology (IT) specialists have the complex and resource-intensive task of managing fleets of computer-operated devices, such as printers and copiers, across large corporations. These devices often require software updates to manage security or other settings. Master file cloning is a method being developed for managing such updates across a large fleet of devices in a corporation or other organization. Creating, distributing, and installing such files can be performed remotely. To make this job more manageable, one-size-fits-all master clone files may be sent out from remote corporate IT groups to all devices in the fleet. This essentially makes all devices identical, at least in respect to settings and security levels. This approach is easier for remote IT teams, but it creates a problem when there are multiple levels or groups of devices within the corporation's clone file distribution tree. To make matters more complex and resource intensive, if a device moves from one level or group to another, corporate IT must set it up all over again, individually.

One problem is that there are often various levels or groups of devices that require different settings than other levels or groups, thus making the task of creating, delivering and installing device clone files complex and resource intensive. For example, multiple clone files must be created by a centralized IT department, and each clone file needs to be delivered to the correct group of devices for the settings that clone file is set up for.

Further, creating, installing, and distributing master clone files makes it easier for remote IT teams to manage large fleets; that is, it makes all the devices essentially identical in setting and security. In reality, however, there are always uniquely-chartered departments in any corporation whose distinctive device needs require settings that are different from the rest. It is complex and expensive to manage these exceptions, since new master clone files are being distributed and installed on corporate device fleets on a frequent basis.

Thus, when corporate IT teams distribute and install master clone file, all devices for all groups in the corporation became essentially identical in settings and security. Since master clone files are distributed and installed frequently, this means that every time a uniquely-chartered group required an exception to the settings on the master clone file, either IT has to send someone out to remote locations to change the settings required by uniquely-chartered groups or else they had to provide local administrators with credentials to change exception-settings at their sites. The former is cost restrictive for remote IT departments. The latter is an objectionable task for local admins due to the frequency of master clone file distribution.

Continually negotiating and implementing exceptions from one-size-fits-all master clone file settings is costly. But it is also costly to ignore the reality that some groups within a corporate structure require unique device settings to avoid inhibiting group productivity or prevent rendering the group's jobs unable to be performed.

Thus, there remains a need for a system and method for making remote device fleet management less expensive and less resource intensive.

INCORPORATION BY REFERENCE

The following references, the disclosures of which are incorporated herein in their entireties by reference, are mentioned:

U.S. application Ser. No. 16/158,771, filed Oct. 12, 2018, entitled HIGHLY-SCALABLE NATIVE FLEET MANAGEMENT, by Kenneth B. Schleede, et al.; and U.S. application Ser. No. 16/210,159, filed Dec. 5, 2018, entitled HYBRID SORTING OF DEVICES FOR FILE DISTRIBUTION, by Paul Roberts Conlon, et al.

BRIEF DESCRIPTION

In accordance with an aspect of the exemplary embodiment, a method of processing location and level changes for managed devices is provided. The method includes at least one child device sensing a move to a new location and level in a tree structure, wherein the tree structure comprises a group of managed devices and includes a root device and a plurality of child devices on a plurality of levels and wherein the levels have different permissions and policies, and the at least one child device receiving permissions and policies for the new location and level via a master clone file. The master clone file contains all information needed to cover cloning needs of all levels of devices in the group of managed devices, which includes a knowledge of each managed device and its level-unique cloning needs.

Optionally, the at least one child device senses the move to the new location and level in the tree structure from other child devices on the new level and the at least one child device receives permissions and policies for the new location and level via the master clone file from at least one other child device on the new level. The updated permissions and policies for the new location and level via the master clone file may be automatically applied, a master clone file heading may be updated with the new location and level in the tree structure, and the root device may be automatically notified of the new location and level of the at least one child device in the tree structure.

Optionally, upon sensing the move to the new location and level in the tree structure, the at least one child device automatically sends new location and level information to the root device and the at least one child device receives permissions and policies for the new location and level via the master clone file from the root device. The master clone file may be configured to compare a device profile of the at least one child device with information in the master clone file, wherein the device profile includes level and/or group information.

In accordance with another aspect of the exemplary embodiment, a method of method of processing device exemption requests for a group of managed devices is provided. The method includes installing a master clone file on a child device after distribution from a root device, wherein the master clone file contains permissions and policies for the group of managed devices, and receiving a specific exemption request to edit the permissions and policies for the child device after the master clone file has been installed. If the specific exemption request can be granted, then at least one of the following is performed: producing a unique clone file from the master clone file, which contains intelligence of individual device exceptions that have been granted at the root device or within the master clone file, such that only this unique clone file is applied to devices which have been granted an exception, creating a new level or group-specific clone file, and/or setting a new exemption policy for the device.

The exemption request may be received via at least one of the following: directly from the device via any type of network or data transferring method, via a printed request, and/or via a voice request. The new exemption policy may reside on the device. Also, the clone file may originate from at least one of the following distribution-capable repositories: a cloud-based repository, a server-based repository, and/or a USB storage device.

The root device or the master clone file may install a blocking policy which resides on each exception device and contains intelligence that prevents the master clone file from effecting pre-approved setting anomalies which have been granted and wherein the unique exceptions are tracked and controlled at the root device or by the master clone file. Also, a log of all exceptions within the group of managed devices may be maintained at the root device or within the clone file for determining which exceptions are in effect and on which child device.

In accordance with yet another aspect of the exemplary embodiment, a method of updating profiles in managed devices is provided. The method includes identifying at least one setting in at least one of the managed devices that should not be updated automatically, setting at least one respective flag associated with the identified at least one setting, thereby indicating that the at least one setting is not to be updated automatically, receiving a file with updated policy values, and updating settings of the at least one managed device according to the updated policy values except for the at least one setting associated with the at least one respective flag indicating that the setting should not be updated automatically.

DETAILED DESCRIPTION

Described herein is a method for updating the security and usage settings ("configuration") of individual devices in a multi-function printer fleet in such a way as to maintain fleet consistency where needed but provide the flexibility to support custom configurations at as fine a resolution as at the device level. Importantly, this methodology enables the more seamless distribution of these configurations centrally via a single "master clone file" (say, from the IT group's central office) that contains the settings for the entire fleet rather than requiring individual IT personnel to visit each device and/or do the distribution locally (which is the current methodology to distribute the multiple clone files involved in the process now). It also enables configurations to be more-easily updated if and when devices are moved around the physical, network, and/or organizational infrastructure of the company. All of this has benefits for consistency of the configuration roll-out, speed of roll-out, and time & cost savings for the IT department.

Also described herein is a method of making exceptions to master clone file settings less costly and resource-intensive while allowing the root device (corporate IT) to track and control exceptions through a revocable policy (on the master clone file, a separate clone file, or a policy installed on the multi-function printer), which shields designated multi-function printers from having certain settings changed by master clone files. As used herein, the terms "exception" and "exemption" may be used interchangeably.

Figure 1:
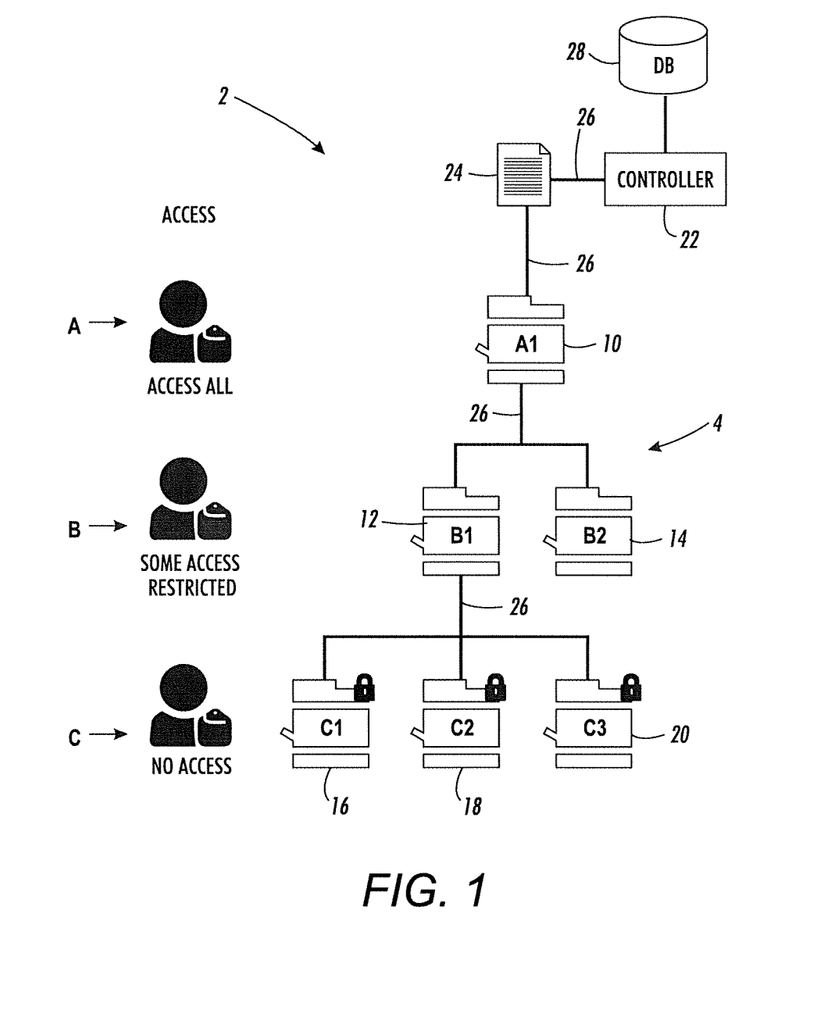
FIG. 1 is a functional block diagram of a system in accordance with an aspect of the exemplary embodiment.

FIG. 1 illustrates an exemplary system 2 including a fleet 4 of managed devices in a tree structure, including devices A1 (10), B1 (12), B2 (14), C1 (16), C2 (18), and C3 (20). While six devices are illustrated, it is to be appreciated that there may be any number of managed devices (e.g., 20, 50, 100, etc.) in the network or enterprise. The exemplary devices are image forming devices, such as printers, copiers, scanners, and/or multifunction printers (MFPs) which perform printing as well as other functions, such as printing, copying, scanning, and/or faxing. A fleet of such devices may be distributed across an organization in different physical locations and/or used by people in different departments and/or having different job functions/device requirements. As a result, identical updates to the devices are often not desirable across the entire fleet.

In this example, one of the managed devices (i.e., device 10) is set up to act as a root (or publisher) device and distribute data to the managed devices. Exemplary devices 12 and 14 are considered siblings of each other because they all receive files from the same parent device 10, at least in some circumstances. However, device 12 may require different settings than device 14, e.g., because they serve different roles, based, for example, on the job functions of their users. Likewise, devices 16, 18, and 20 are considered siblings of each other because they all receive files from the same parent device 12, at least in some circumstances.

As shown in FIG. 1, the fleet 4 of managed devices has three access (or permission) levels—labeled A, B, and C. Thus, in this example, level A, which includes the root device 10, has full access to files. Level B, which includes the devices 12 and 14, has some restricted access to files. Level C, which includes the devices 16, 18, and 20, has no access to files. The fleet 4 of devices shown in FIG. 1 has two levels below the root node 10. However, there may be fewer or more than three levels, such as from 1-10 levels. For example, some of the nodes at the third level may have child nodes forming a fourth distribution level and so forth.

A network controller 22 may be used for distributing data 24 to the managed devices 10, 12, 14, 16, 18, 20, among other things. The data 24 may include updates to the devices in the form of one or more master clone files 24 and may be distributed via wired or wireless links 26, such as a local area network, wide area network, or the like. In the case of image forming devices, the distributed files 24 may include, for example, updates to device security settings and/or settings related to the performance of printing, scanning, copying, and the like. The network controller 22 represents the source of the file 24 in this example, although in some embodiments, it could be any one of the managed devices, such as the root device 10.

Exemplary devices 12 and 14 are considered siblings of each other because they all receive the file 24 from the same parent device 10, at least in some circumstances. However, device 12 may require different settings than device 14, e.g., because they serve different roles, based, for example, on the job functions of their users. Likewise, devices 16, 18, and 20 are considered siblings of each other because they all receive the file 24 from the same parent device 12, at least in some circumstances.

A "root device," as the term is used herein, refers to a device 10 that serves as the top-level "gold standard"; that is, it is programmed identically to the master clone file 24. From the root device 10, all other devices in the enterprise are cloned. The root device 10 automatically sends the master clone file 24 to all devices, but the file may pass through other devices in the tree structure 4 before reaching a specific child device.

A "child device," as the term is used herein, refers to a device that has been set up to receive and act upon the master clone file 24 (e.g., devices 12, 14, 16, 18, 20). The child device may also act as an agent of the root device 10 to allow the master clone file 24 to pass through its structure 2 to any number or level of other child devices.

A "master clone file," as the term is used herein, refers to a file 24 that contains data that, through a cloning tool, transmits data structures (e.g., permissions and policies and/or settings and functionality) from one drive or device to another device regardless of where the originating data for the file is physically or ethereally (e.g., cloud) located. This means the clone tool 24 attempts to build the identical data structures, permissions and policies (settings and functionality) on the receiving (child) device by reading the file system delivered from the source (parent) drive or device and applying those structure to the receiving device such that the data structures, permissions and policies (settings and functionality) on the receiving (child) device match those on the source or root device 10.

The master clone file 24 may also include publishing information which specifies, for each of the managed devices, the child devices to which it is to distribute the master clone file 24, and a time schedule for doing so. This publishing information may be stored in the managed devices and thus need only be included in the data file 24 when changes are made (or may be sent in a separate file).

With continued reference to FIG. 1, the network controller 22 includes a database 28, such as a graph database, which stores information about the devices 10, 12, 14, 16, 18, 20, including distribution profiles, among other things. The distribution profiles may include various types of data relating to the devices, including, but not limited to: the identity of the publisher (which device made it), the subscribers (which devices can receive it), the pointer file (what file), the scheduler, the edit policy at the subscriber level, whether limited to a schedule, auto save files, and/or whether to download file for new version or always download.

At intervals, the network controller 22 may receive updates and/or exception requests. Example updates include changes to parent/child relationships (e.g., MFP 12 has been made a child of MFP 18, a new MFP is being added to the graphics department MFPs), changes in attributes (e.g., MFP 12 has been moved to a different building, MFP 16 is to receive update files 24 twice weekly). The exception requests include requests from users of the devices to be provided with exceptions to a master clone file, such as different security settings and so forth. The authorized user may be provided with a user interface for making changes. For example, if the user actuated an add device button in an interface, the window allows the user to select a device or devices to be added, select a download schedule, and other aspects, such as selecting an installation schedule. Some of the selections may have default settings, e.g., based on settings for the parent device, which the user may select to modify. The network controller 22 may receive a notification of changes made to the fleet 4 by a user and store the changes in the database 28. The network controller 22 may make appropriate changes to the file(s) 24.

In practice, the system administrator creates the master clone file 24 within or affecting the root device 10. This master clone file 24 contains all the information needed by all devices in the enterprise. This master clone file 24 generally contains all credentials required to effect changes upon all child devices (e.g., devices 12, 14, 16, 18, 20, etc.) it is parent to within the enterprise 2.

A set schedule or event may trigger the root device 10 to send out its most recent master clone file 24 to the devices in the enterprise 2. The transmitted master clone file 24 contains information that directs it to submit itself to a specific collection of child devices, which are also programmed to accept and act upon master clone files originating at the root device. During this transfer, the contents of the master clone file 24 are expected to pass through multiple child devices to various levels/locations of the enterprise effecting changes upon those child devices, based upon layer and location, for example.

As the master clone file 24 travels through the enterprise 2 it is received, acted upon, and passed on to other devices within the enterprise. This is accomplished through the child device reading the file and determining how it affects itself and what it is supposed to do with the file after (or as) it affects the master file's changes upon itself. This continues through the second layer/level, third layer/level, and through the plurality of other layers/levels up to the Nth layer/level.

When the master clone file is 24 received at each child device, the directives of the master clone file are applied to the child device such that the pre-programmed settings and functions set up in the master clone file are applied to each child device, regardless of level/location. The result of this is that the child device is set up in a way that is identical to the parent device for areas upon which the master clone file touches upon.

If so configured at the device or by the master clone file 24, after a device has applied the master clone file's settings and function changes (or failed to completely satisfy the directions in the clone file), the now-cloned device sends a report to the root 10 and/or other concerned entities to indicate the final status of the clone. Those who receive the report may determine from this if further cloning or other actions are desired. Transmitting/receiving confirmation information from each managed device completes the cloning process.

Figure 2:
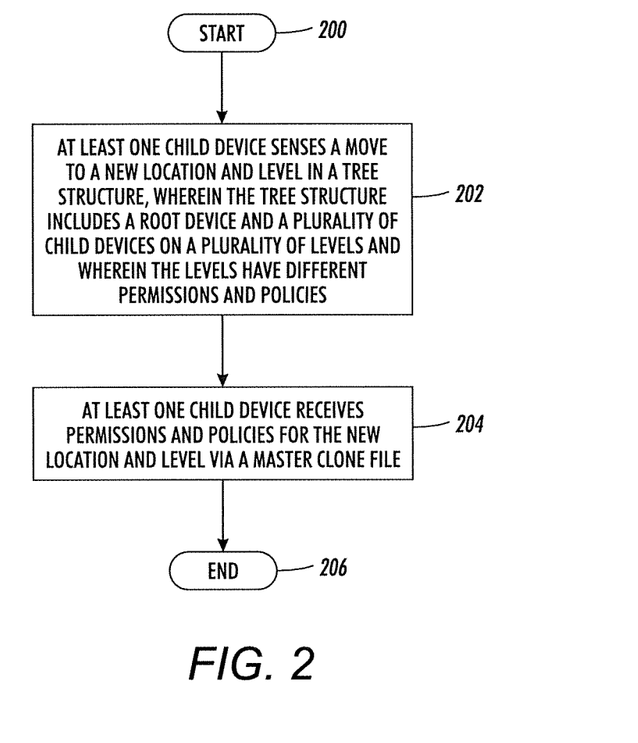
FIG. 2 illustrates a method of processing device location and level changes in accordance with aspects of the exemplary embodiment.

FIG. 2 illustrates an exemplary method of processing location and level changes for managed devices, which may be implemented in the exemplary system 2. The method begins at S200.

Figure 3:
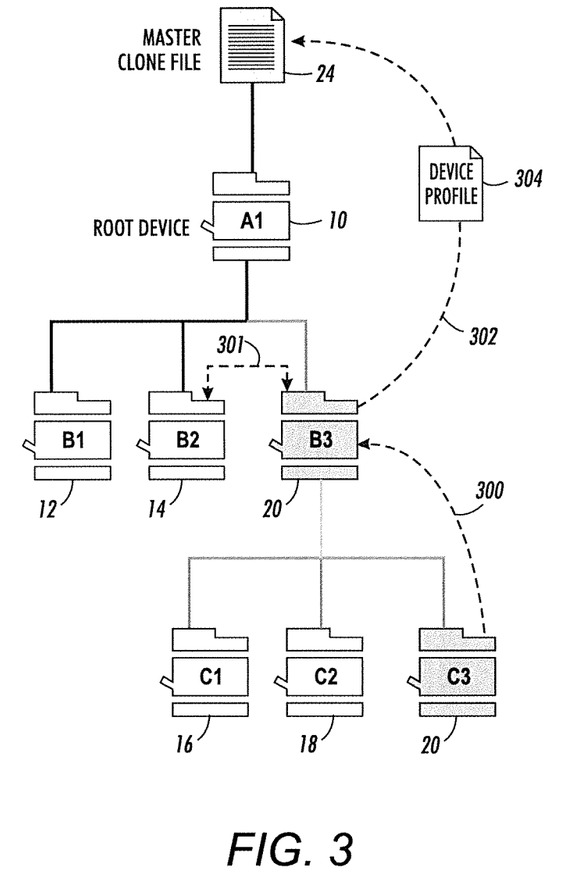
FIG. 3 is a functional block diagram of the system showing a device location and level change in accordance with aspects of the exemplary embodiment.

At S202, one of the child devices in the system 2 senses that it has moved to a new location and level (e.g., a new subnet) in the tree structure 4 with different permissions and policies for that location and level. For example, as shown in FIG. 3, device 20 may be moved (300) from level C to level B.

At S204, the child device 20 receives permissions and policies for the new location and level via the master clone file 24, for example. The master clone file 24 contains all information needed to cover cloning needs of all levels of managed devices in the system 2, which includes a knowledge of each device in the system and its level-unique cloning needs.

The method ends at S206.

Corporate IT may set the auto-level sense/change feature for the managed devices via the root device 10 (or the network controller 22), for example. Thus, in one embodiment, the child device 20 automatically senses the move (300) to the new location and level in the tree structure 4 (i.e., from C3 to B3) from one or more other child devices on the new level. In that case, the child device 20 receives (301) permissions and policies for the new location and level (B3) via the master clone file 24 from at least one other child device on the new level (e.g., from device 14).

The updated permissions and policies for the new location and level via the master clone file 24 may be automatically applied, with a master clone file heading being updated with the new location and level in the tree structure 4, and the root device 10 being automatically notified (302) of the new location and level of the child device 20 in the tree structure via the device profile 304, such that the master clone file 24 is able to apply only changes for that child device's new layer/level.

In another embodiment, upon sensing the move (300) to the new location and level in the tree structure 4 (i.e., from C3 to B3), the child device 20 automatically sends new location and level information to the root device 10. In that case, the child device 20 receives permissions and policies for the new location and level via the master clone file 24 from the root device 10.

The master clone file 24 is sent to the device 20 and compares the device's profile, which contains level or group information, with the information in the master clone file 24, as defined by the administrator when the master clone file was created.

Based upon this comparison, updated level/layer-specific permissions and policies (settings and functions) are automatically applied to the device 20. The master clone file 24 contains all the information needed to cover the unique cloning needs of all levels/locations of devices in the enterprise, which includes a knowledge of each device in the enterprise and its level/location-unique cloning needs.

The exemplary method as shown in FIGS. 2 and 3 and as described above thus allows individual devices of any level or location to change level/location based upon: a) physical movement of the device to a different level/location; b) the repurposing of that device because of its remaining physically in a location whose occupants have changed, or whose current occupants' permissions and policies have changed. During this transfer, the contents of the master clone file 24 pass through multiple child devices that do not share common level/layer-related attributes. This affects other child devices on the enterprise 2 with different cloning effects on those child devices which the master clone file 24 passes.

A relocated or repurposed device notifies the root device 10 of its permissions and policy changes (layer/location), such that the root device maintains a record of which child devices are subject to the permissions and policies of which layers/levels, i.e., which devices are currently at any level and layer within the enterprise.

The root device 10 can automatically send an update to the master clone file 24 to advise the root device that it has been relocated or repurposed (changing its previous established layer/level) or physically moved (e.g. new subnet). When the master clone file 24 is received at each child device the layer/location comes into play such that certain portions of the master clone file are applied to the child device, based on its layer/location and other portions are ignored for device's on that particular layer/location, then a report is issued, unique to the layer/level the child device is residing within, which informs the root device of the success or failure of its unique attributes.

Optionally, exceptions to master clone file settings are made less costly/resource-intensive while allowing corporate IT, through the root device 10, to track and control exceptions, through a revocable policy (on the master clone file, a separate clone file, or a policy installed on the device), which shields designated devices from having certain settings changed by master clone files.

For example, let us assume that corporate IT has limited the selectability of high resolution scans to reduce network burden. In that case, they have determined that 300×300 dpi provides sufficient resolution and thus restricts the selection of higher resolution usage across the fleet using the master clone files that are routinely installed on every device in the fleet through a tree-structured distribution, such as the system shown in FIG. 1. However, a marketing graphics department may require their devices (Child) to scan at high resolution (1200×1200). Thus, each time the master clone file 24 is remotely installed on their devices by corporate IT, the child device must change the restriction either by a credentialed local administrator, or by making a request to corporate IT to send someone out with the proper authority to "unlock" the high resolution settings on their devices. The marketing graphics department may make an official request to the corporate IT department to approve a setting shield to be installed in their devices to prevent automatically-installed cloning files from changing the resolution settings on their (and only their) devices.

By utilizing its efficient functionality, corporate IT departments can use the same tree structure 4 and master clone file 24 to manage the settings of all the devices across the company but still allow some groups with unique need for settings and security exceptions to shield their devices from defined universal settings, which are regularly cloned into their groups' devices. In other words, once installed at the device or by a unique file, the exemplary embodiment thus protects IT-approved exception settings from being changed With reference now to FIG. 4, an exemplary method of handling exemption requests for managed devices may be implemented in the exemplary system 2 of FIG. 1. The method begins at S400.

Figure 4:
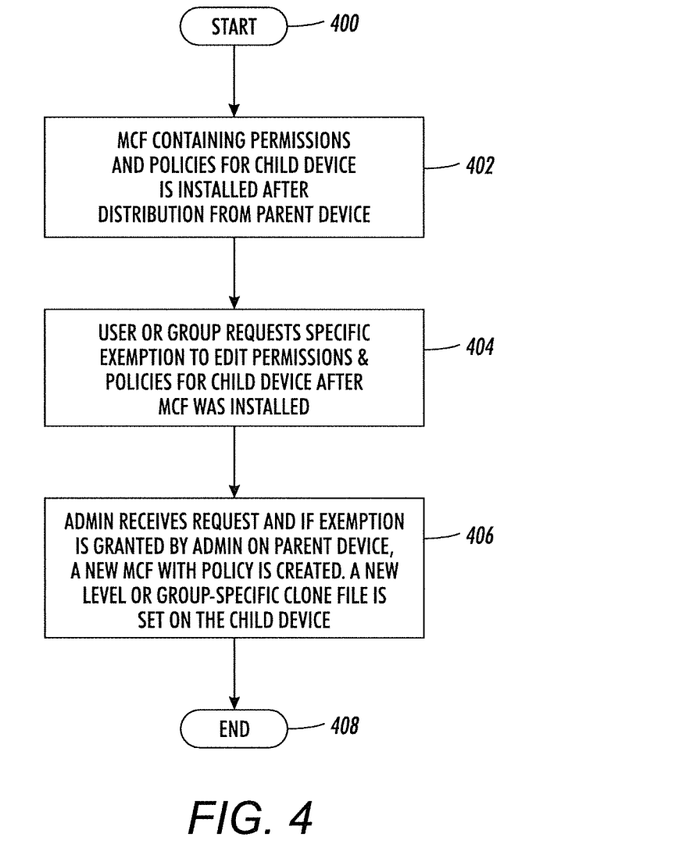
FIG. 4 illustrates a method of processing exemption requests in accordance with aspects of the exemplary embodiment.

At S402, the master clone file 24 distribution process begins. The master clone file 24 contains permissions and policies for the managed devices 10, 12, 14, 16, etc., among other things, and is installed on one or more of the child devices in the system 2. For example, the master clone file 24 may be installed on device 16 after distribution from the root device 10. In particular, data (e.g., settings and functions) may be transmitted via the master clone file 24 from the root device 10 to other devices residing in the enterprise in such a way that individual workgroups whose distinctive device needs require settings that are different from the rest of the enterprise due to unique charters, location requirements or other reasons, can apply the master clone file but be exempted from designated universal settings otherwise mandated within the master clone file.

This may be achieved by enabling the master clone file 24 or the root device 10 to track and control individual exceptions to master clone file policies, through a revocable exception policy, which shields designated devices from applying certain settings within master clone files that are typically applied to all devices in an enterprise. This may be accomplished despite policies defined by the master clone file 24 to make all devices within the enterprise 2 identical.

The revocable exception policy may be located, for example, on the master clone file 24, on a separate clone file, and/or on a policy installed on the managed device.

The master clone file 24 contains the ability to track and control individual device exceptions that have been granted and treat distinctive settings and functions on devices deemed to require unique exceptions differently than the rest of the enterprise on a revocable or schedule-terminating basis, among other things. Each uniquely-shielded child device receiving the master clone file 24 is automatically prevented from effecting changes to shielded settings, despite the universal application of master clone files.

At S404, the exemption request process begins. In this example, a group or user, such as the non-admin user, determines that the settings for a managed device, such as device 16, are too strict and requests a specific exemption to edit the permissions and policies for the device 16 after the master clone file 24 has been installed from the root device 10 by the system administrator. In a non-limiting example, an efficient user interface at the device 16 allows the non-admin user to make the request at the point the desired feature is blocked. Name, IP address, level, location, and other details may be auto filled in. The non-admin user enters the justification in a space provided and selects "send."

It is noted that the exemption request may be received directly from the managed device via any type of network or data transferring method, via a printed request, and/or via a voice request. It is noted that the new exemption policy may reside on the device. Also, the clone file may originate from one or more of the following distribution-capable repositories: a cloud-based repository, a server-based repository, and/or a USB storage device.

At S406, the exemption approval process begins. The system administrator receives the exemption request from the non-admin user at a system device, such as the root device 10 or the network controller 22. The request is processed according to IT conventions via an efficient user interface at the master file decision-making level, such as at the root device 10.

If an exemption can be granted by the system administrator or the root device 10, the exemption policies and duration are defined and the master clone file containing the IT approval/response is sent out and the system security/handshake takes place at the device that has been granted the exception, such as at device 16. Additionally, a unique clone file can be automatically produced from the master clone file 24 or other method, which contains intelligence of individual device exceptions that have been granted at the root device or within the master clone file, such that only this unique clone file is applied to devices which have been granted an exception. In this scenario, the master clone file 24 does not attempt to apply any settings to the device with exceptions, but instead flags each exception child device to receive a unique clone file exclusively tailored to its users/groups unique needs based upon the ability to track and control individual device exceptions which have been granted. Alternatively, a new level or group-specific clone file can be created and/or a new policy for device 16 can be set.

The method ends at S408.

Thus, the root device 10 or the master clone file 24 or some other method may install a blocking policy which resides on each exception device and contains intelligence that prevents the master clone file from effecting pre-approved setting anomalies which have been granted. These unique exceptions may be tracked and controlled at the root device 10, by the master clone file 24, or by some other method.

This allows individual devices with unique-setting needs to communicate with the root device and requests specific exemptions to some defined group of settings. If not rejected, those responsible for the master clone files can then grant or modify those requests within the master clone file (or other cloning mechanism) that will exempt an individual device from effecting clone file-based changes to specific settings on that device.

A policy can be created and set on the device (at the device or remotely) that shields certain settings from any attempt by a master clone file (or other cloning mechanism) to execute changes upon those settings.

Those who administer the master clone file 24 can communicate with the unique device (through cloning mechanisms, Bi-Di or other remote methodologies) to set up or remove policies which shield certain settings from any attempt by a master clone file (or other cloning mechanism) to effect changes upon those settings.

An expiration date can be scheduled to any individual device exception policy, such that the exception is removed from the master clone file 24, the unique clone file, or the child device policy, such that in granting exceptions, cloning administrators maintain control of exceptions until such a time as the exceptions expire or are revoked.

Cloning administrators can repeal some or all exceptions residing in the master clone file 24, a unique clone file, or on the device at the root device 10 or master clone file in a single step.

A log of all exceptions within the enterprise may be maintained at the root device 10 or within the clone file 24 such that administrators can always determine which exceptions are in effect and on which child device.

Thus, a child device (e.g., a local MPF user in a uniquely-chartered group) assesses the group's exception needs and requests exceptions from corporate IT for their managed devices. This keeps the root device 10 (i.e., corporate IT department) in control. The root device 10 approves/grants the exceptions and passes them onto the affected devices, tracks all exceptions for all uniquely-chartered groups with managed devices, can revoke the exceptions at any time, can set up a limited time-period within which the exceptions are valid, and can set up a schedule for regular reviews to confirm that the exceptions are still valid.

Figure 5:
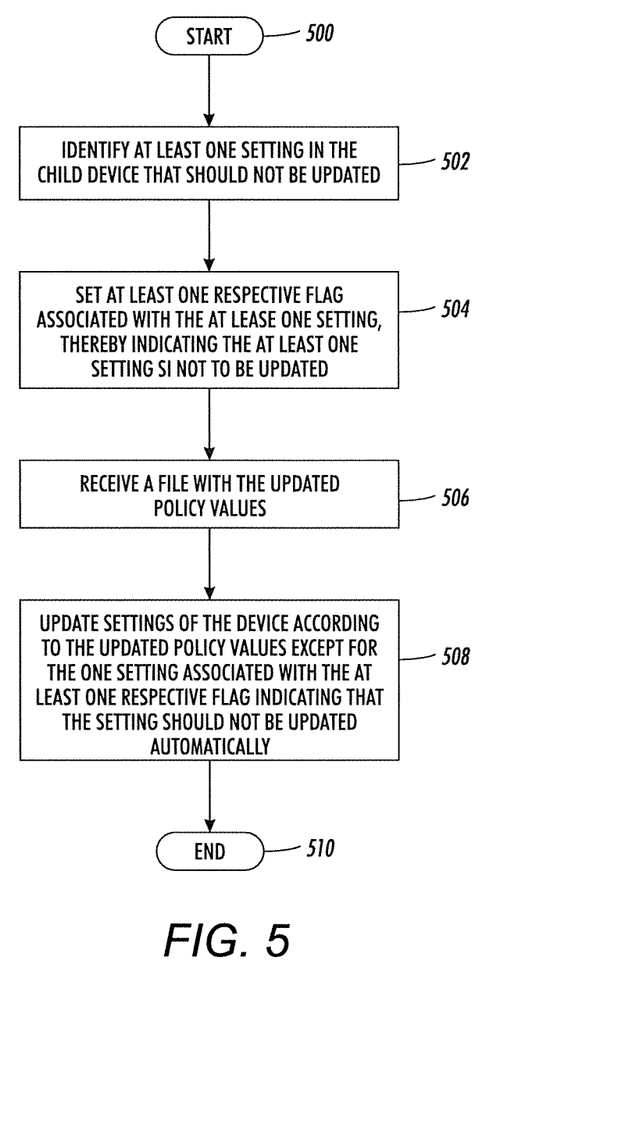
FIG. 5 illustrates a method of updating profiles in a device in a system in accordance with aspects of the exemplary embodiment.

FIG. 5 illustrates an exemplary method of updating profiles in managed devices, which may be implemented in the exemplary system 2 of FIG. 1. The method begins at S500.

The method includes, at S502, identifying at least one setting in a managed device, such as device 20, that should not be updated automatically.

Next, at S504, at least one respective flag associated with the identified at least one setting is set, thereby indicating that the at least one setting is not to be updated automatically in the device.

At S506, a file with updated policy values is received at a device in the system 2, such as the root device 10 or the network controller 22.

At S508, settings of the managed device are updated according to the updated setting values except for the at least one setting associated with the at least one respective flag indicating that the setting should not be updated automatically.

At S510, the method ends.

It is to be understood that the exception may reside on the managed device or at some other storage repository.

The methods illustrated in FIGS. 2, 4, and 5 may be at least partially implemented in a computer program product or products that may be executed on a computer or computers. The computer program product(s) may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the methods may be implemented in transitory media, such as a transmittable carrier wave in which the control program is embodied as a data signal using transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing a part of the flowcharts shown in FIGS. 5-9, can be used to implement the methods. As will be appreciated, while the steps of the methods may all be computer implemented, in some embodiments one or more of the steps may be at least partially performed manually.

As will be appreciated, the steps of the methods need not all proceed in the order illustrated and fewer, more, or different steps may be performed.

Figure 6:
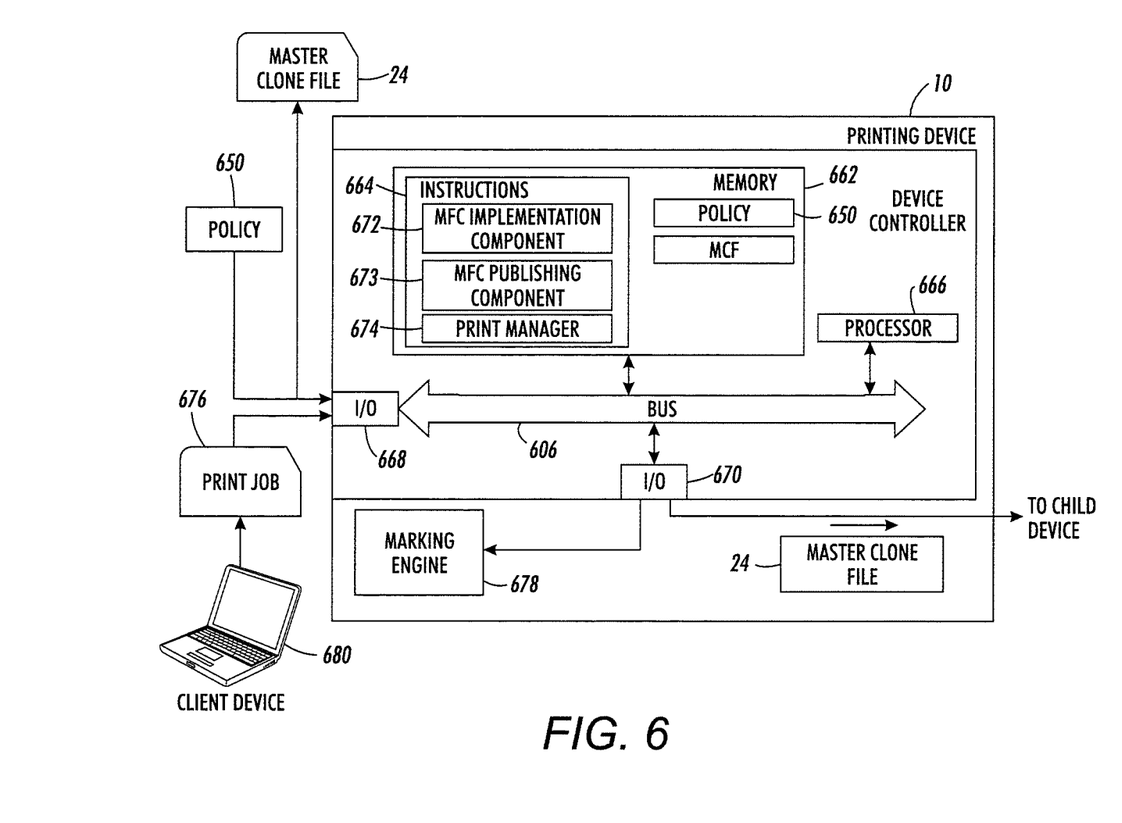
FIG. 6 is a functional block diagram illustrating an exemplary managed device.

With reference now to FIG. 6, it is to be understood that each of the managed devices 10, 12, 14, 16, 18, 20 includes a respective device controller 660. The device controller includes memory 662, which may store at least one policy 650, and instructions 664, which are implemented by an associated processor 666. The master clone file 24 is received from the respective parent device by an input device 668 and stored in memory 662. The policy 650 for managing exceptions for the device may be received from the parent device or directly from a higher-level device, such as the network controller 22. An output device 670 transmits the file 24, such as a master clone file, (optionally with the policy) to the children of the device, if there are any. The software instructions 664 include a master clone file implementation component 672, for implementing the master clone file on the respective device in accordance with the policy 650, a file publishing component 673, for sending the master clone file to the children of the managed device, in accordance with the update schedule and/or when a request for download is received from the child devices, and a print manager 674 for controlling printing of received print jobs 676 on an associated marking engine 678. In the case of a printing device, the master clone file 24 may thus include updates to printer settings, security and so forth.

Each of the managed devices 10, 12, etc., may be similarly configured, with a master clone file implementation component 672 and file publishing component 673. In this way, even if the managed device currently has no children in the distribution tree 24, it is ready to perform the functions of a parent device if its position in the tree 24 is changed.

The printing device 10 may receive print jobs 676 from a source device 680, such as a user's computing device, network server, scanner, USB device, smartphone, or the like. Each print job 676 may include one or more images, such as text, graphics, photographs, or the like, to be printed. The print manager 674 may be instructed by the MFC implementation component to control the printing in accordance with the MFC 24, as modified by the policy 650 for that device. The print manager therefore controls the execution of the print jobs 676 by the marking engine 678 accordingly. The marking engine 678 includes hardware elements for rendering the digital print job images on a print media substrate, such as paper, using a marking material or materials, such as colored inks or toners and for outputting the printed sheets.

The computer-implemented system 2 may include one or more computing devices 22, 680, each of which may be a PC, such as a desktop, a laptop, palmtop computer, portable digital assistant (PDA), server computer, microprocessor, cellular telephone, tablet computer, pager, combination thereof, or other computing device capable of executing instructions for performing the exemplary method.

The memory of the illustrated computing devices 22, 680 may include any type of non-transitory computer readable medium such as random access memory (RAM), read only memory (ROM), magnetic disk or tape, optical disk, flash memory, or holographic memory. The input/output interfaces may comprise a modulator/demodulator (MODEM) a router, a cable, and and/or Ethernet port. The digital processors of the computing devices 22, 680 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, internet-based programs stored on a remote server or so forth, source code, interpretive code, object code, directly executable code, and so forth. It is contemplated that the software may invoke system-level code or calls to other software residing on a server or other location to perform certain functions.

The system 2 may thus transmit data (e.g., settings and functions) via the master clone file 24 from the root 10 to a variety of layers/levels of devices residing in the enterprise 24 in such a way that the single master clone file 24 addresses diverse layers/levels along with their unique permissions and policies (settings and functions) as the master clone file 24 passes through the enterprise 24 (and through other devices). Thus, a child device applies only the changes desired for the predetermined layer/level in which such child device resides. Accordingly, through a solitary master clone file 24 a plurality of devices of a plurality of layers/levels are cloned only according to the predetermined needs of its particular layer/level.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of processing location and level changes for managed devices, the method comprising:
   at least one child device sensing a move to a new location and level in a tree structure, wherein the tree structure comprises a group of managed devices and includes a root device and a plurality of child devices on a plurality of levels and wherein the levels have different permissions and policies;
   the at least one child device receiving permissions and policies for the new location and level via a master clone file.

2. The method of claim 1, wherein the master clone file contains all information needed to cover cloning needs of all levels of devices in the group of managed devices, which includes a knowledge of each managed device and its level-unique cloning needs.

3. The method of claim 2, further comprising:
   the at least one child device sensing the move to the new location and level in the tree structure from other child devices on the new level;
   the at least one child device receiving permissions and policies for the new location and level via the master clone file from at least one other child device on the new level.

4. The method of claim 3, wherein the updated permissions and policies for the new location and level via the master clone file are automatically applied, a master clone file heading is updated with the new location and level in the tree structure, and the root device is automatically notified of the new location and level of the at least one child device in the tree structure.

5. The method of claim 2, further comprising:
   upon sensing the move to the new location and level in the tree structure, the at least one child device automatically sending new location and level information to the root device;
   the at least one child device receiving permissions and policies for the new location and level via the master clone file from the root device.

6. The method of claim 2, wherein the master clone file is configured to compare a device profile of the at least one child device with information in the master clone file, wherein the device profile includes level and/or group information.

7. The method of claim 2, wherein the group of managed devices comprises one or more image forming devices.

8. The method of claim 7, wherein the one or more image forming devices comprises multi-function printers.

9. A method of processing device exemption requests for a group of managed devices, the method comprising:
   installing a master clone file on a child device after distribution from a root device, wherein the master clone file contains permissions and policies for the group of managed devices;
   receiving a specific exemption request to edit the permissions and policies for the child device after the master clone file has been installed;
   if the specific exemption request can be granted, then at least one of the following is performed:
   producing a unique clone file from the master clone file, which contains intelligence of individual device exceptions that have been granted at the root device or within the master clone file, such that only this unique clone file is applied to devices which have been granted an exception,
   creating a new level or group-specific clone file, and/or setting a new exemption policy for the device.

10. The method of claim 9, wherein the exemption request is received via at least one of the following: directly from the child device via a network or data transferring method, via a printed request, and/or via a voice request.

11. The method of claim 9, wherein the new exemption policy resides on the child device.

12. The method of claim 9, wherein the master clone file originates from at least one of the following distribution-capable repositories: a cloud-based repository, a server-based repository, and/or a USB storage device.

13. The method of claim 9, wherein the group of managed devices comprises one or more image forming devices.

14. The method of claim 13, wherein the one or more image forming devices comprise multi-function printers.

15. The method of claim 9, wherein the root device or the master clone file installs a blocking policy which resides on each exception device and contains intelligence that prevents the master clone file from effecting pre-approved setting anomalies which have been granted and wherein the unique exceptions are tracked and controlled at the root device or by the master clone file.

16. The method of claim 9, wherein a log of all exceptions within the group of managed devices is maintained at the root device or within the clone file for determining which exceptions are in effect and on which child device.

17. A method of updating profiles in managed devices, the method comprising:
   identifying at least one setting in at least one of the managed devices that should not be updated automatically;
   setting at least one respective flag associated with the identified at least one setting, thereby indicating that the at least one setting is not to be updated automatically;
   receiving a file with updated policy values;
   updating settings of the at least one managed device according to the updated policy values except for the at least one setting associated with the at least one respective flag indicating that the setting should not be updated automatically.

18. The method of claim 17, wherein the updated settings reside on the at least one managed device.

19. The method of claim 17, wherein the managed devices comprise one or more image forming devices.

20. The method of claim 19, wherein the one or more image forming devices comprise multi-function printers.

* * * * *